United States Patent [19]
Sobue

[11] Patent Number: 5,495,407
[45] Date of Patent: Feb. 27, 1996

[54] INVERTER WITH SEQUENTIAL PROCESSING FUNCTION

[75] Inventor: Masaru Sobue, Kawasaki, Japan

[73] Assignee: Fuji Electric Co., Ltd., Kawasaki, Japan

[21] Appl. No.: 89,815

[22] Filed: Jul. 12, 1993

[51] Int. Cl.[6] .................................................. G05B 19/02
[52] U.S. Cl. ........................... 364/140; 364/136; 318/811
[58] Field of Search .................................. 364/140–147, 364/130, 131, 135, 136, 137, 138; 318/801–803, 807, 810, 84; 363/55–56, 98, 132

[56] References Cited

U.S. PATENT DOCUMENTS 4,698,744 10/1987 Itami et al. .............................. 364/140
4,969,119 11/1990 Kurokawa et al. ...................... 364/140

Primary Examiner—Roy N. Envall, Jr.
Assistant Examiner—Thomas E. Brown
Attorney, Agent, or Firm—Kanesaka & Takeuchi

[57] ABSTRACT

An inverter equipment equipped in itself with a sequence processing function which is capable of preparing and processing an operation sequence corresponding to signals of various external inputs is herein disclosed. A rewritable operation sequence program of the inverter equipment and a sequence operation logic operated under control of a CPU which receives signals 20 of various external inputs through an interface according to the sequence program are memorized in a semiconductor memory built in a sequence operation unit 10 of the inverter equipment, and the operation sequence corresponding to general input-output signals 10a is processed according to the sequence program.

6 Claims, 2 Drawing Sheets

INVERTER WITH SEQUENTIAL PROCESSING FUNCTION

BACKGROUND OF THE INVENTION

1. Field of the Invention

The present invention relates to an inverter equipment equipped in itself with a processing function of an operation sequence.

2. Description of the Prior Art

In a conventional inverter equipment, an operation sequence to various input-output signals for operation is processed by using a programmable controller or relay sequence circuits, separated from the inverter equipment.

In such an inverter equipment, a programmable controller which processes the operation sequence or the relay sequence circuits is separately needed. Therefore, wiring between apparatus such as other controllers increases and the space for installation of necessary apparatuses becomes large. The entire inverter equipment is large and its price rises. Further, the number of input-output of the above-mentioned inverter equipment is restricted. Moreover, the condition settings, which are able to be changed from the outside, are limited. To overcome the problems of such an equipment, the purpose of this invention is to provide an inverter equipment in which a sequence processing is enabled.

SUMMARY OF THE INVENTION

In an inverter equipment according to the invention, a sequence program which can be rewritten and a sequence operation logic are memorized in a semiconductor memory built in the inverter equipment to achieve the above-mentioned purpose. The sequence operation logic is operated by the above-mentioned sequence program under control of a CPU which receives signals of various external inputs through interfaces. An operation sequence according to general input-output signals is processed by the sequence program.

The purpose of this invention is to give a processing function of the operation sequence of the inverter equipment to the inverter equipment itself. Logic operation functions such as counters, timers and shift registers are allocated in the memory built in the above-mentioned inverter equipment. Moreover, the sequence program such as sequence operation conditions is memorized in a built-in separate non-volatile memory. Under the control of the CPU (Central Processor) which exchanges data with a clock signal generating part, a ROM (Read-Only Memory) and a RAM (Random-Access Memory), this equipment performs a necessary sequence processing for various signals by operating logically with respect to general various external signals which are input through the CPU according to the above-mentioned sequence program. The processed results become operation command signals such as acceleration, deceleration, braking, stop, etc. to the inverter in the above-mentioned inverter equipment.

Besides, the above-mentioned various external signals are operation command signals from the outside to the above-mentioned inverter equipment and operation state confirmation signals containing the alarm contents of the inverter equipment operated according to the commands. Since the change of a specified sequence to operation condition according to the above-mentioned various external signals can be made by rewriting the above-mentioned sequence program in the inverter equipment, characteristics of the above-mentioned various input signals need not be restricted specifically, but general and common correspondence can be made easily.

DESCRIPTION OF PREFERRED EMBODIMENTS

Figure 1:
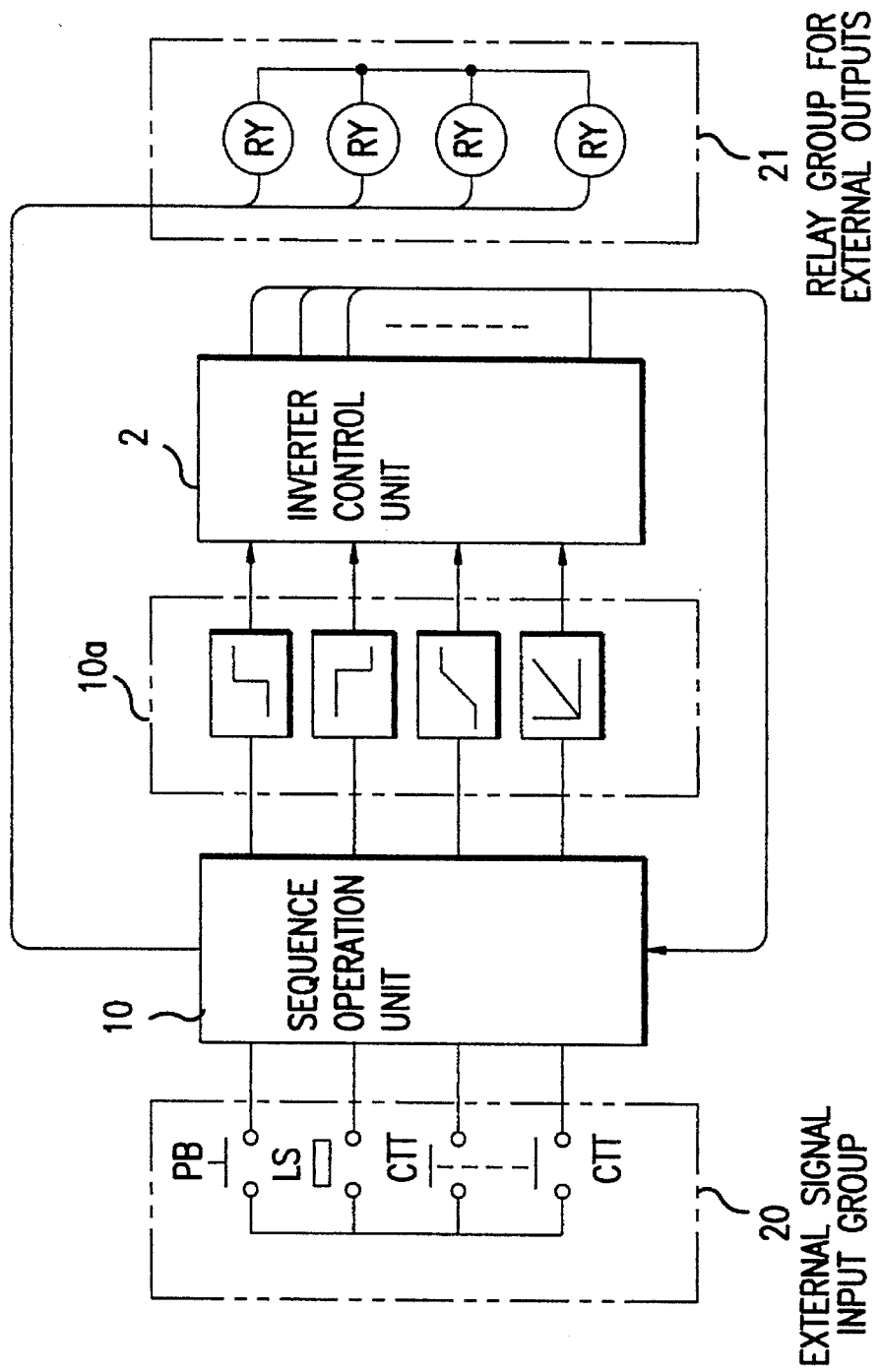
FIG. 1 is a block circuit diagram of an entire control system showing an embodiment of an inverter equipment equipped in itself with a sequence processing function according to the present invention.
Figure 2:
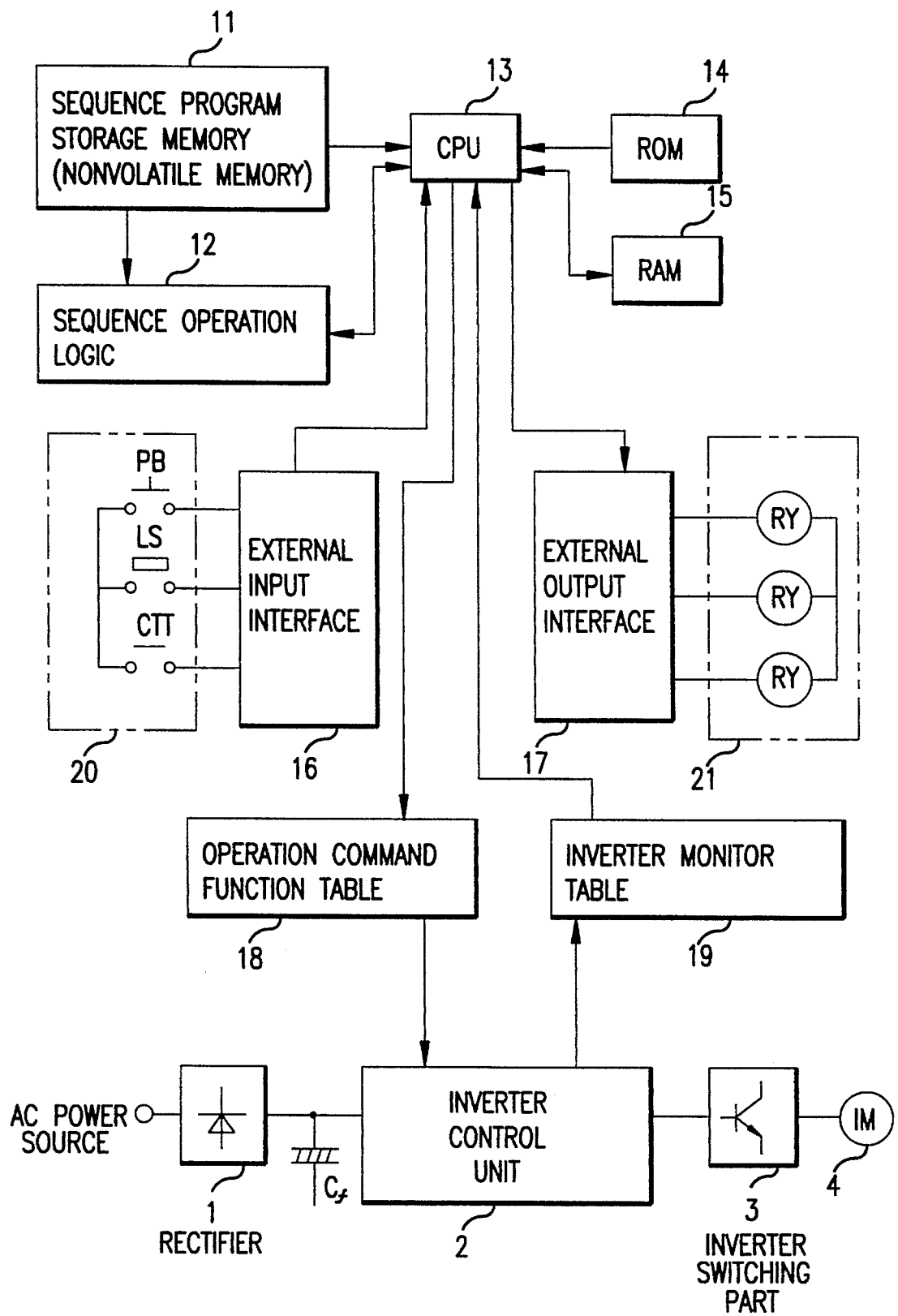
FIG. 2 is a block circuit diagram showing an embodiment of the sequence operation unit of FIG. 1.

Hereinafter, an embodiment of the present invention is explained in detail with reference to FIGS. 1 and 2, in which common components and parts in FIGS. 1 and 2 are designated by the same reference numerals and detailed explanations thereof are omitted.

FIG. 1 is a block circuit diagram of an entire control system showing an embodiment of an inverter equipment equipped in itself with a sequence processing function according to the present invention.

An inverter equipment according to the present invention comprises an inverter control unit 2, a sequence operation unit 10 and various command signals 10a to the inverter control unit, and is further connected to an external signal input group 20 and a relay group 21 for external outputs. The general external input signal group 20 comprises various signals by which the operation conditions of the inverter equipment are specified. The various input signals are given to the sequence operation unit 10 through, for instance, pushbutton switch PB, limit switch LS, control input contacts CTTs from other external control circuits, or the like. The sequence operation unit 10 is built in the inverter equipment, comprises logic operation elements including a semiconductor memory and a CPU, receives each of the above-mentioned input signals, and processes the sequence operation for the above-mentioned inverter equipment. The processing results are output as the various command signals 10a to the inverter control unit 2. For instance, the command signals such as acceleration, deceleration, braking, stop and voltage/frequency ratios are included in the various signals 10a. Moreover, the operating conditions of the above-mentioned inverter equipment corresponding to various signals are fed back from the above-mentioned inverter control unit 2 to the above-mentioned sequence operation unit 10 as operating condition confirmation signals in which contents of fault alarms are contained, and the contents of the above-mentioned command signals 10a are changed by the sequence program when necessary. In addition, the relay group 21 for the external outputs is used for the monitor signals for the operated contents of the above-mentioned sequence operation unit 10, and outputs lamp signals or control signals to the external circuit.

Next, FIG. 2 shows details of the sequence operation unit 10 together with an inverter main circuit which is the control object of the sequence operation unit.

The sequence operation unit 10 comprises a sequence program storage memory 11, a sequence operation logic 12, a CPU 13, a ROM 14, a RAM 15, an external input interface 16, an external output interface 17, an operation command function table 18 and an inverter monitor table 19. The inverter main circuit comprises a rectifier part 1, the inverter control unit 2, an inverter switching part 3, an IM (Induction Motor) 4 and a smoothing capacitor Cf.

The program to make the sequence operation is written in the sequence program storage memory 11, which comprises a nonvolatile memory because the memorized data should be kept even under the condition of interruption of power supply. Moreover, logic operation function parts such as a counter, a timer, a shift register and a supplementary relay are allocated and memorized in the sequence operation logic 12, and various signals of the above-mentioned external input signal group 20 given through the external input interface 16 are processed sequentially according to the program data in the above-mentioned storage memory 11. The processed results are given to the above-mentioned inverter control unit 2 as the above-mentioned command signals 10a through the operation command function table 18. The operation conditions of the inverter equipment operated according to the various signals 10a are read in the inverter monitor table 19 as the above-mentioned operation condition confirmation signals and are used for the sequence operation by the above-mentioned sequence operation logic 12. Besides, the above-mentioned various operations are performed under the control of the CPU 13 which exchanges the data with the ROM 14 and RAM 15 and receives the clock input. In addition, the external output interface 17 is an interface for the above-mentioned operation content monitor signals.

According to the present invention, it is possible to memorize in the built-in semiconductor memory the rewritable sequence program and the sequence operation logic which operates according to the above-mentioned sequence program under control of the CPU receiving the various external input-output signals through the interface. Since the operation sequence according to the general input-output signals are internally processed by the above-mentioned sequence program, a separated signal processing equipment, as in a conventional programmable controller which processes the operation sequence of the inverter equipment corresponding to the signals of various external inputs, becomes unnecessary. In addition, the changes of the control specifications can be made easily and rapidly only by rewriting the above-mentioned memory built in the inverter equipment. Therefore, a low cost, an easy operation and a reduced mounting space necessary for the entire inverter equipment can be made.

What is claimed is:

1. An integral type inverter equipment provided with a sequence processing function adapted to be integrally connected to an inverter as one unit, comprising:

an inverter control unit electrically connected to the inverter for controlling the inverter; and a sequence operation unit connected to the inverter control unit, said inverter control unit and the sequence operation unit being built together with the inverter as one unit, said sequence operation unit including a CPU; a sequence program storage memory connected to the CPU for memorizing a program for a predetermined sequence operation; a sequence operation logic connected to the sequence program storage memory and the CPU; an external input interface connected to the CPU so that external signals supplied to the CPU through the external input interface are processed by program data memorized in the sequence program storage memory and supplied to the inverter control unit for controlling the inverter; and an inverter monitor table situated between the inverter control unit and the CPU for receiving signals for operating condition of the inverter from the inverter control unit, said signals for the operating condition of the inverter being supplied to the sequence operation logic through the CPU for sequence operation so that the operation condition of the inverter is confirmed.

2. An inverter equipment according to claim 1, wherein said sequence operation unit further includes an operation command function table situated between the inverter control unit and the CPU for supplying operating signals to the inverter.

3. An inverter equipment according to claim 2, wherein said sequence logic compares signals for the operation command function table and signals from the inverter monitor table.

4. An inverter equipment according to claim 3, wherein said sequence operation unit further includes an external output interface connected to the CPU for indicating operating condition of the sequence operation unit.

5. An integral type inverter equipment provided with a sequence processing function, comprising:

an inverter;

an inverter control unit electrically connected to the inverter for controlling the same; and a sequence operation unit electrically connected to the inverter control unit for operating the inverter through the inverter control unit, said inverter control unit and the sequence operation unit being built together with the inverter as one unit, said sequence operation unit including a CPU; a sequence program storage memory connected to the CPU for memorizing a program for a predetermined sequence operation; a sequence operation logic connected to the sequence program storage memory and the CPU; an external input interface connected to the CPU so that external signals are supplied to the CPU through the external input interface, processed by program data memorized in the sequence program storage memory and supplied to the inverter control unit for controlling the inverter; an operation command function table situated between the inverter control unit and the CPU for supplying signal to the inverter control unit from the CPU through the operational command function table; an inverter monitor table situated between the inverter control unit and the CPU for receiving signals for operating condition of the inverter from the inverter control unit, said signals for the operating condition of the inverter being supplied to the sequence operation logic through the CPU for sequence operation so that the operation condition of the inverter is confirmed; and an external output interface connected to the CPU for indicating an operating condition of the sequence operation unit.

6. An inverter equipment according to claim 5, wherein said operation logic includes a counter, a timer, a shift register and a supplimental relay.

* * * * *